United States Patent [19]
Putnam, Jr.

[11] 3,965,796
[45] June 29, 1976

[54] MACHINE TOOL TRACER CONTROL SYSTEM

[75] Inventor: Cecil J. Putnam, Jr., Union City, Mich.

[73] Assignee: Putnam Pattern & Engineering Co., Coldwater, Mich.

[22] Filed: June 29, 1976

[21] Appl. No.: 545,009

[52] U.S. Cl. .................................. 90/13 R; 90/62 R
[51] Int. Cl.² ............................................. B23C 1/16
[58] Field of Search ................ 90/62 R, 13 R, 13 B, 90/24.3, 24.4

[56] References Cited
UNITED STATES PATENTS

| | | | |
|---|---|---|---|
| 1,787,761 | 1/1931 | Pomplum et al. | 90/62 R |
| 2,549,024 | 4/1951 | Siepe | 90/62 R X |
| 2,923,518 | 2/1960 | Goodrich | 90/62 R |
| 3,293,989 | 12/1966 | Kurtz | 90/13 R |

*Primary Examiner*—Othell M. Simpson
*Assistant Examiner*—Z. R. Bilinsky
*Attorney, Agent, or Firm*—Beaman & Beaman

[57] ABSTRACT

A control system for tracer controlled machine tools, such as milling machines and the like, wherein a template is employed to machine a contour on a workpiece. In accord with the invention the machined contour is of a uniform transverse cross-sectional configuration throughout its longitudinal length, and the template is supported on a carriage as to be fixed with respect to the tracer control in the direction of the length of the machined contour. The support of the template, and the use of positioning means to maintain the template in a predetermined relationship to the cutting tool and tracer permits a two-dimensional template to be utilized in the machining of three-dimensional contours.

5 Claims, 6 Drawing Figures

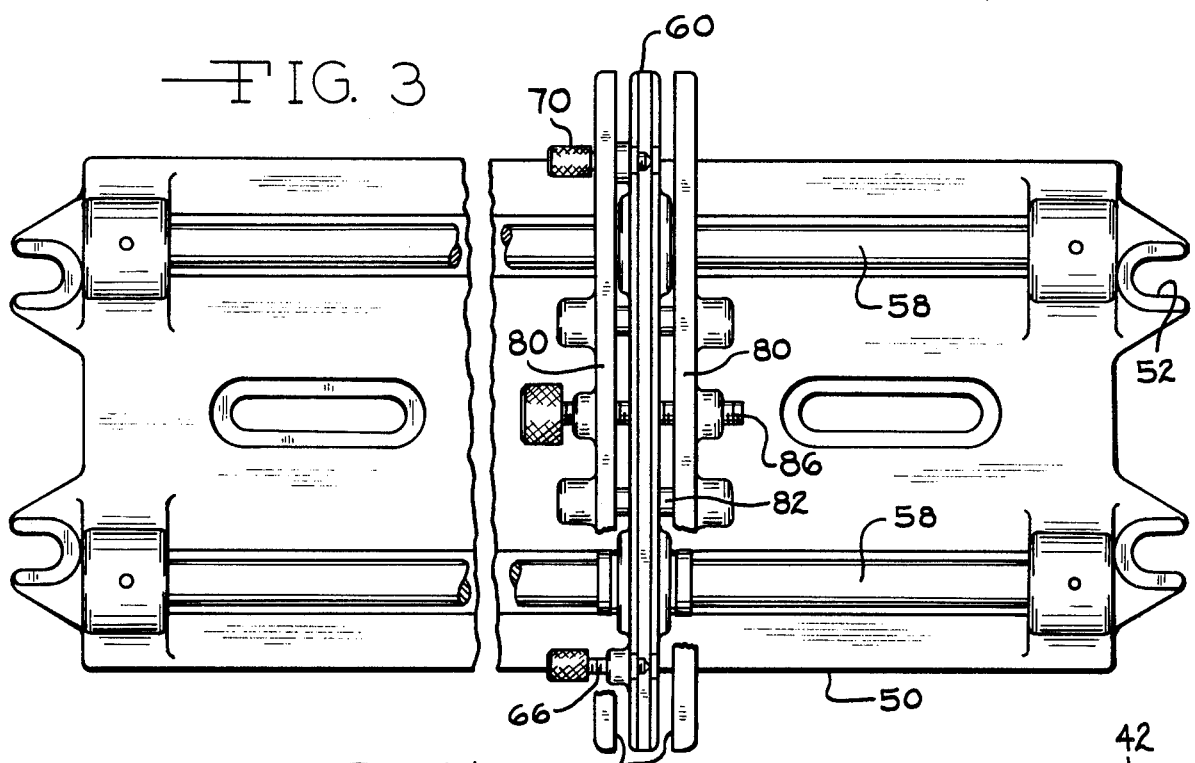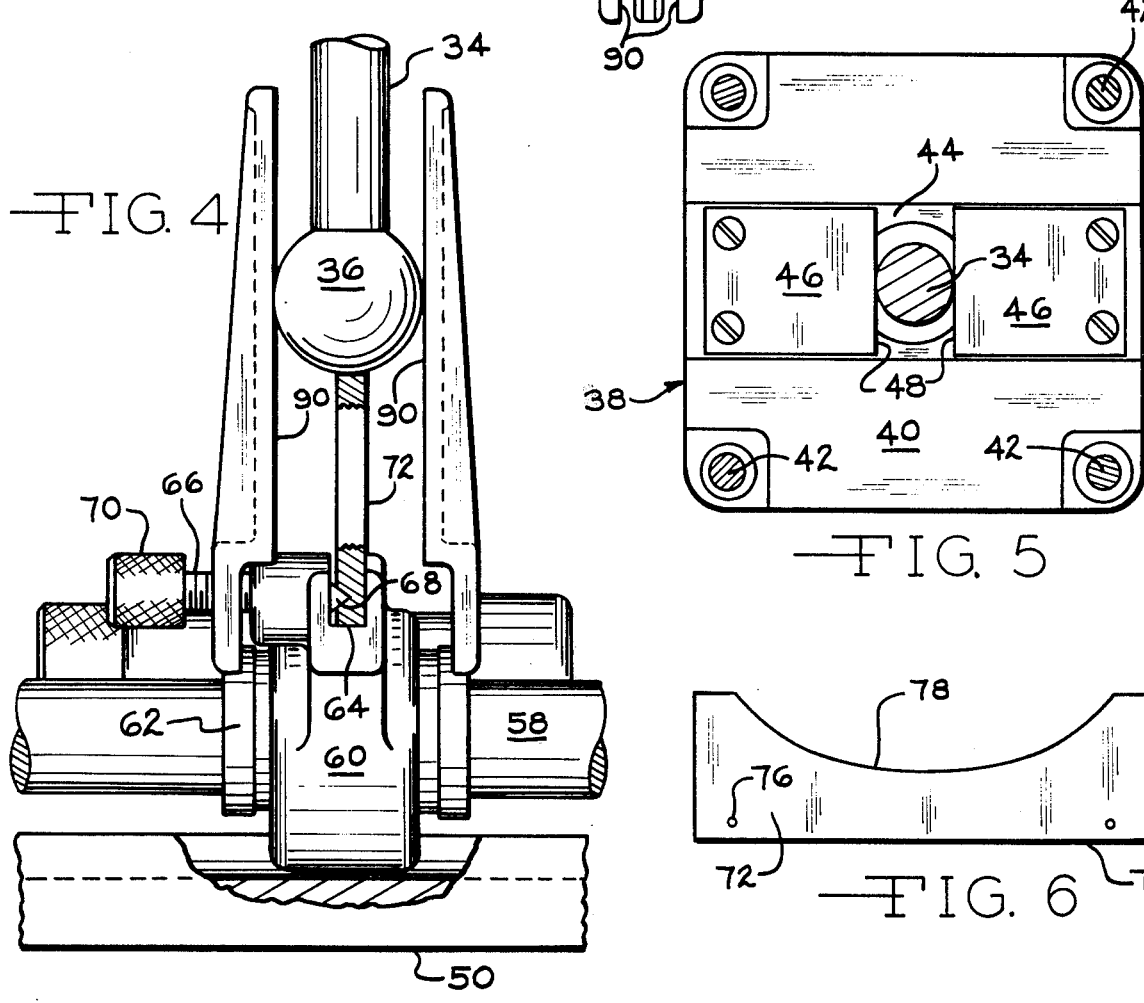

MACHINE TOOL TRACER CONTROL SYSTEM

BACKGROUND OF THE INVENTION

The invention pertains to machine tool tracer control systems, and in particular, wherein a two-dimensional template may be utilized in the machining of a three-dimensional workpiece contour.

Tracer controlled machine tools, such as milling machines, commonly utilize a tracer, usually air or hydraulically controlled, to sense a three-dimensional template or pattern for controlling the relative position of the cutting tool and workpiece to duplicate the template contour upon the workpiece. Significant cost savings is experienced by the use of tracer controlled machine tools in that a plurality of irregular contoured surfaces may be accurately machined upon a plurality of workpieces with a minimum of attention and supervision by the machine operator.

While tracer controlled machine tools have the advantage of accurately duplicating a template surface on a plurality of workpieces, the three-dimensional template or pattern traversed by the tracer must be very accurately produced, even though formed of wood, plastic or other material which is relatively easy to machine and shape. Due to the relatively high cost of producing an accurate three-dimensional pattern or template the economies of tracer control machines are only experienced with relatively high production machining operations wherein one template may be used to produce many workpiece surfaces. As a practical matter, tracer control machine tools are not economically usable with short run machining operations wherein only a relatively limited number of contoured surfaces are to be machined, due to the cost of producing the necessary three-dimensional template. Accordingly, tracer control machine tools, in the past, have not been economically used in low production machining operations, and the advantages of this type of machine tool have been limited to multiple machining operations wherein the cost of producing a relatively complicated three-dimensional template is justified.

Attempts have been made to form three-dimensional contours from two-dimensional templates, such as shown in U.S. Pat. Nos. 2,933,985; 3,230,810 and 3,640,182, but such patented devices require two templates and tracers and are expensive and not readily adaptable for "short run" production.

SUMMARY OF THE INVENTION

It is an object of the invention to provide a machine tool tracer control system wherein a three-dimensional contour may be machined from an economically produced two-dimensional template or pattern using a single tracer, thereby rendering the use of tracer control machine tools with short run machining operations practical.

An additional object of the invention is to provide a machine tool tracer control system wherein an elongated contoured surface of uniform transverse cross-section may be accurately machined from a two-dimensional template having a contour formed therein corresponding to the cross-sectional configuration of the contour to be machined.

An additional object of the invention is to provide a machine tool tracer control system wherein the template remains fixed with respect to the tracer during the cutting operation in the direction of the longitudinal length of the contour being machined, and positioning means maintain the template in a predetermined relationship to the tracer during cutting.

In the practice of the invention a two-dimensional template, usually consisting of a contoured surface machined upon flat or sheet stock, is mounted within a template holder defined on a carriage. The template carriage is slidably mounted upon guideways fixed relative to the workpiece, and parallel to the longitudinal direction of the contour to be machined. A positioner for the template is fixed relative to the tracer in the direction of the longitudinal length of the contour, and in the disclosed embodiment this positioner comprises the tracer stylus itself, the stylus being restrained against movement in the longitudinal length of the machined contour.

The template carriage includes a pair of spaced parallel surfaces perpendicularly disposed to the contour length between which the template positioner is received. In this manner the template positioner produces movement of the template in the direction of the contour length, but the positioner may move relative to the template carriage in a direction at right angles to the contour length. In the disclosed embodiment the template carriage positioning surfaces are defined upon opposite sides of the template wherein the tracer stylus is received between these surfaces and engages the template, which is also located intermediate these surfaces. By utilizing the tracer stylus simultaneously as the template carriage positioner, and the control element for the tracer, the arrangement of the necessary components is simplified, and a simple and concise apparatus may be defined on the template carriage which provides for both positioning the template carriage, and holding and sensing the template.

In accord with the invention the template carriage is mounted upon a base which is fixed upon the machine tool table. The base includes a pair of spaced parallel guides, in the form of rods, and the template carriage is mounted upon the rods for translation thereon during movement of the work table relative to the cutting tool. The template carriage includes a template holder or clamp, in which the two-dimensional template is firmly held, and adjustment means are mounted on the template carriage for accurately positioning the spacing between the parallel surfaces which cooperate with the template positioner.

In the disclosed embodiment the tracer stylus is utilized as the template positioner, and in order to restrain the stylus, which is normally mounted for universal movement, a stylus restrainer is mounted upon the tracer housing cooperating with the stylus to prevent displacement thereof in a direction parallel to the contour length. The stylus restrainer does not require modification of the tracer itself, and removal of the restrainer restores the tracer stylus to its universal operation to permit use in the conventional three-dimensional mode.

BRIEF DESCRIPTION OF THE DRAWINGS

The aforementioned objects and advantages of the invention will be appreciated from the following description and accompanying drawings wherein:

FIG. 3 is a top plan view of the template base and carriage with the template removed, FIG. 4 is an enlarged, detail, end elevational view of the template carriage, partially illustrated in section, FIG. 5 is an enlarged plan sectional view taken along section V—V of FIG. 1, through the upper portion of the stylus and the stylus restraining structure, and FIG. 6 is a reduced scale elevational view of a template in accord with the inventive concept.

DESCRIPTION OF THE PREFERRED EMBODIMENT

Figure 1:
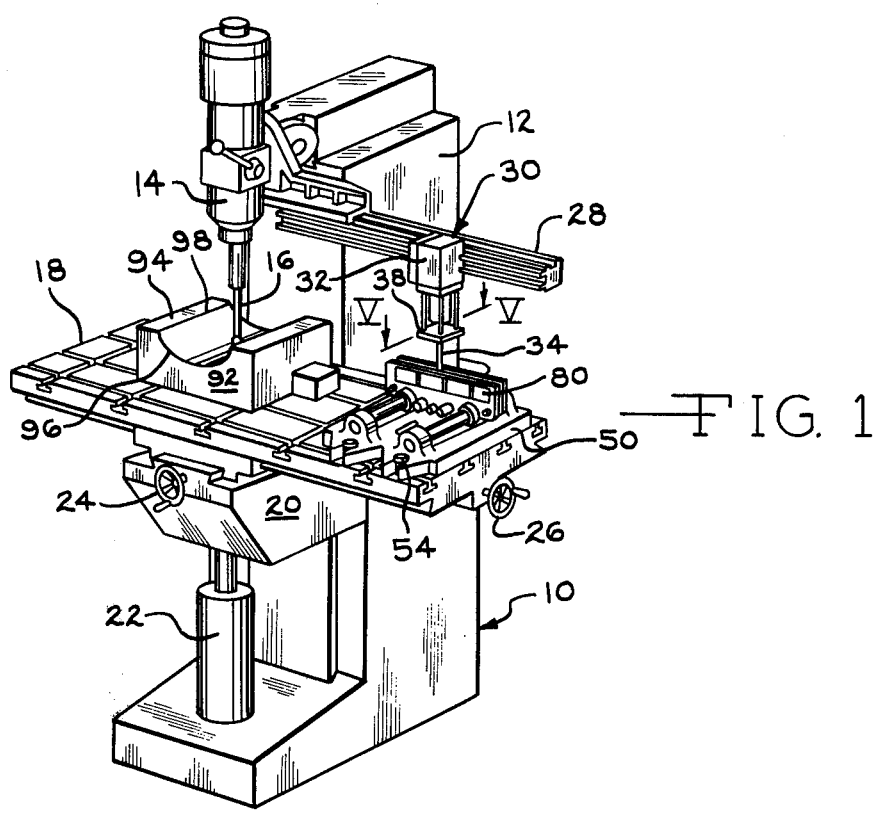
FIG. 1 is a perspective view of a machine tool upon which the tracer control system in accord with the invention has been installed.
Figure 2:
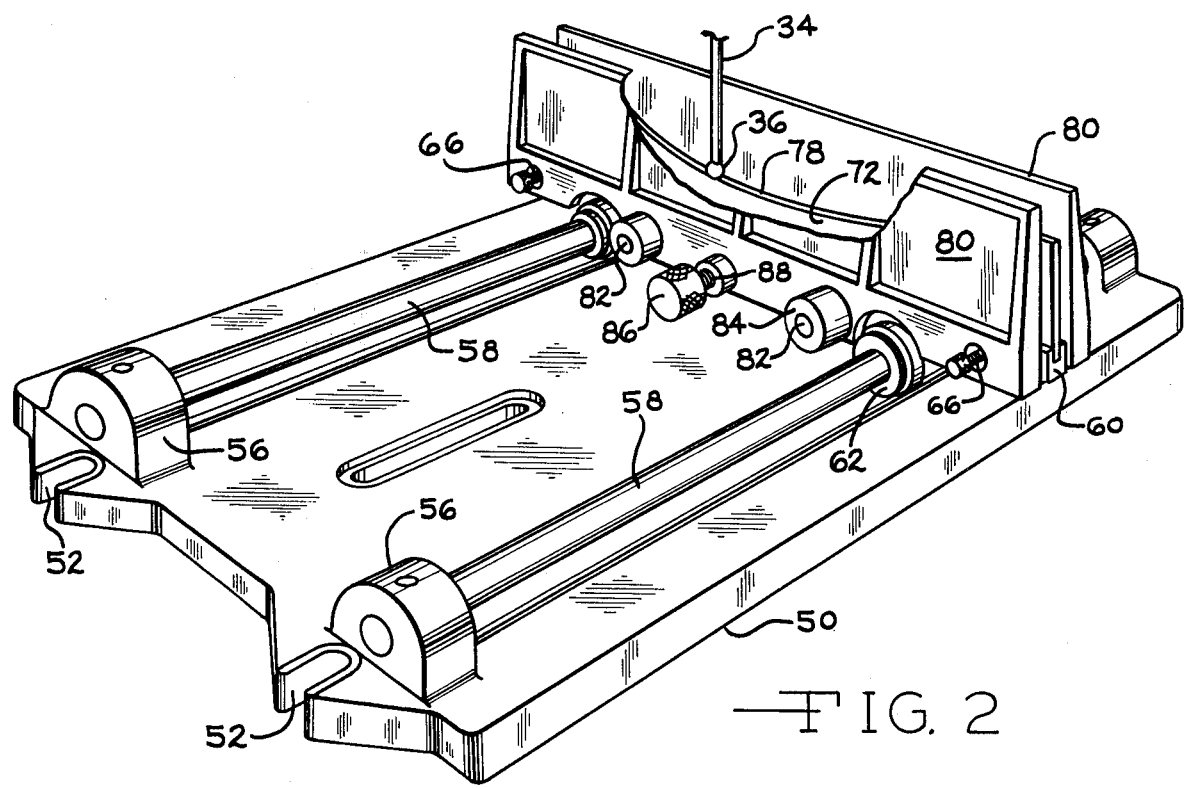
FIG. 2 is a perspective view of the template base and carriage, a portion of a template carriage positioning plate being broken away for purpose of illustration.

The machine tool tracer control system in accord with the invention can be used with various types of machine tools wherein relative movement takes place between the cutting tool and the workpiece. For instance, the invention can be used on various types of milling machines, drilling machines, shapers, and other machine tools, other than lathe type machine tools, which lend themselves to tracer control. The invention is particularly suitable with milling machines, and in the illustrated embodiment of the invention a vertical milling machine 10 is illustrated in order to describe the invention in a typical environment.

The milling machine 10 includes a frame 12, having an upper portion on which the power head 14 is mounted. The power head includes a rotatable work spindle in which the cutting tool 16 is mounted. The front portion of the frame supports a worktable 18 upon the table carriage 20. The table and carriage may be raised and lowered by power means, such as an hydraulic cylinder 22, and the usual feed screws, not shown, are utilized with the worktable for positioning the worktable relative to the carriage. Hand wheels 24 and 26 are used to manually rotate these feed screws, in the conventional manner, and the feed screws may also be power driven by conventional milling machine drive mechanism, not shown. Also, the vertical position of the worktable may be adjusted by power, such as through operation of the cylinder 22. It is to be understood that the details of arrangement and operation of the milling machine 10 form no part of the present invention, and it is only necessary that the machine tool have sufficient power control devices associated therewith to permit the machine tool to be tracer controlled. For instance, the inventive concept may be utilized with a relatively inexpensive machine tool upon which tracer controlled attachments, including power slides and carriages are mounted, or the inventive concept may be utilized in machine tools specially designed and constructed for use with tracer controls wherein the relative adjustment between the worktable and cutting tool is accomplished through "built-in" power means.

The control tracer is mounted upon an arm 28 attached to the tool head 14 and extends parallel to and vertically spaced above the worktable 18. Adjustment guideways are defined upon the arm 28 whereby the tracer 30 may be located on the arm at any axial position thereof. The tracer 30, which in itself forms no part of the invention, includes a body 32 in which the control valve, if the tracer is hydraulic or air operated, is located, or if the tracer is of the electrical type appropriate electric sensing means are housed. A stylus 34 extends downwardly from the tracer housing body and is normally of the universal type whereby the enlarged end 36 of the tracer stylus may be moved in any horizontal direction, and such directional movement of the stylus is sensed by the control mechanism within the tracer body 32 to produce a desired signal and operation of the machine tool worktable feed screws to regulate the position of the worktable and the workpiece mounted thereon. Also, the stylus 34 is able to sense vertical displacement in order to control the depth of the machining cut.

In accord with the invention, a restrainer 38 is mounted upon the tracer body 32 to limit horizontal displacement of the stylus end only in a direction transverse to the length of the contour to be machined. The restrainer includes a plate 40 attached to the underside of the tracer body 32 by spacer rods 42, FIG. 1. The plate 40 includes a central opening 44 through which the stylus 34 extends, and a pair of spaced plates 46 are mounted upon the plate 40 to define spaced parallel restraining surfaces 48 engaging the stylus with a sliding fit. Thus, as viewed in FIG. 5, the stylus 34 is capable of moving upwardly and downwardly, but cannot move to the left and right in view of the engagement with the surfaces 48. The stylus restraining plate 40 may be easily attached to, and removed from the tracer body without modification to the stylus or tracer body, and permits the stylus to function as a template positioner, as will be later described.

The template apparatus includes a baseplate 50 which is directly mounted upon the worktable 18 below arm 28, as apparent in FIG. 1. The baseplate includes bolt receiving notches 52 whereby bolts 54, FIG. 1, may firmly clamp the base to the worktable, and guide rod bosses 56 projecting upwardly from the base serve to support a pair of parallel cylindrical guide rods or shafts 58 in spaced relationship to the base upper surface, which is centrally recessed. When mounting the baseplate 50 upon the worktable the baseplate is oriented such that the guide rods 58 are parallel to the length of the contour to be machined, and in the illustrated setup the guide rods 58 are transversely disposed to the length of the worktable.

The template carriage 60 comprises an elongated body member, FIG. 4, having a length substantially equal to the width of the baseplate 50, and includes a pair of bearings 62 sildably receiving the guide rods 58. Thus, the carriage 60 may longitudinally slide upon the guide rods 58, and the closely fitting bearings assure that the length of the carriage will remain transverse to the guide rods during displacement of the template carriage thereon.

Template holding or clamp structure is defined upon the carriage 60, and takes the form of a recess 64, FIG. 4, extending the length of the carriage on the upper side thereof, opening upwardly. Holding screws 66 are threadedly received within the carriage having a pointed end 68 which, upon the screws 66 being threaded inwardly, extend into the template receiving recess 64. Rotation of the screws is accomplished through the knurled heads 70.

A template 72 is received within the recess 64, and held therein by the screws 66. A typical template configuration is illustrated in FIG. 6, wherein the template is in the form of a flat plate or sheet, and is thus considered to be, for practical purposes, two-dimensional. The template is provided with a lower linear surface 74 which rests upon the base of the template receiving recess 64, and holes 76 may be formed in the template plate for receiving the pointed ends of the screws 66.

The contour 78 to be machined is formed in the upper surface of the template, and in the illustrated form, constitutes a concave recess.

Positioning of the template carriage 60 upon the baseplate 50 is accomplished by the positioning plates 80 mounted upon the template carriage. The positioning plates 80 are disposed on each longitudinal side of the carriage, and are mounted on the carriage for adjustment thereto upon guide rods 82 mounted on the carriage body and extending from the longitudinal sides thereof. Each of these plates 80 include a pair of annular bearings 84 receiving the rods 82 whereby the plates may be moved toward and away from the template 72 in a direction parallel to the guide rods 58. Adjustment of the positioning plates 80 is accomplished through the screw 86 which extends through an opening in the carriage, and is provided with right and left hand threads so that rotation of the screw 86 causes the plates to move toward and away from each other through the engagement of the screw with threaded bores 88 defined in the plates 80.

The plates 80 each include an inner planar reference surface 90, and in operation, the spacing between the reference surfaces 90 is adjusted by the screw 86 so as to closely receive the enlarged stylus end 36, FIG. 4. The spacing between the surfaces 90 is such as to permit the stylus to slide between the surfaces, but only very little clearance exists between the stylus and the surfaces whereby the surfaces 90 will always maintain the stylus end directly above the template, and control contour 78.

The operation of a machine tool tracer control system in accord with the invention is as follows:

The workpiece 92, which is illustrated as a rectangular block, is firmly mounted upon the worktable 18, by conventional holddown means. The workpiece includes an upper surface 94, and at the beginning of the cutting operation the worktable 18 will normally be offset sufficiently from the cutting tool 16 to permit the first cut upon the workpiece to be accomplished as the side of the workpiece is brought into engagement with the tool.

It is desired, for purpose of illustration, to form a concave elongated recess 96 in the workpiece having a uniform transverse cross section throughout the longitudinal length of the contour. The cross section of the contour will correspond to the configuration of the template control surface 78, FIG. 6.

To initially align the machine for the first cut the operator locates the worktable 18, by rotation of the hand wheels 24 and 26, or by power drive means, as desired. For instance, it may be desired that the first cut form the upper edge 98, FIG. 1. As the worktable and workpiece are initially positioned relative to the cutting tool 16, movement of the worktable in its longitudinal direction will cause the stylus end 36 to move between the positioning plates 80. Rotation of the hand wheel 24, to move the worktable in the direction parallel to the guide rods 58 will cause the worktable and template baseplate 50 to move relative to the template carriage 60, which is maintained in a fixed position relative to the tracer 30 due to the fact that the stylus 34 is restrained against movement in this direction by the restrainer plate surfaces 48, and thus the template 72 will remain directly below the tracer 30 regardless of the adjustment of the worktable in a direction parallel to the guide rods 58.

The worktable, workpiece and template, or the cutting tool and tracer, are raised or lowered to form the desired depth of cut. This depth of cut may be automatically determined by preset adjustments, or may be tracer controlled, depending on the machine setup, and type of operation desired.

The primary cutting motion will usually be accomplished by relative movement between the workpiece and cutting tool in the longitudinal direction of the contour to be machined. It is possible to produce cutting as the relative movement between workpiece and cutting tool is transverse to the longitudinal direction of the machined contour, but such a directional cut requires relative vertical displacement between workpiece and cutting tool during and between each cut as well as horizontal displacement, while the "parallel" direction of cutting only requires horizontal displacement during each "cut". Regardless of the direction of relative workpiece and cutter movement, the template and cutting tool relationship remains the same due to the ability of the template to maintain its alignment with the cutting tool and tracer stylus as the template baseplate 50 moves relative to the template 72.

It will be appreciated that the length of the guide rods 58 need to be sufficient to accommodate the length of the contour 96 to be machined, and the guide rods 58 are in alignment with the transverse projection of the machined contour 96. Thus, with the practice of the invention it is possible to machine the entire three-dimensional contour 96 in the workpiece by using the two-dimensional plate-like template 72 illustrated.

The cutting operation may be semi-automatic or fully automatic depending upon the self-controlling ability of the machine tool upon which the tracer system is mounted. For instance, indexing of the worktable feed screws may be manually accomplished after each cut, or such indexing, either horizontal or verical, may be accomplished automatically if the machine tool is so programmed, and is capable of such preprogrammed operation. The sensing of the template contour 78 by the stylus 34 will result in a duplication of contour transverse cross-sectional configuration in the workpiece, and the operation of the machine tool under the tracer control proceeds in the manner conventional for the particular machine tool utilized.

As the apparatus of the invention permits an inexpensive template to be used to form three-dimensional configurations it will be appreciated that the practice of the invention permits tracer controlled machine tools to be utilized for the manufacture of short run production workpieces. As long as the contour being machined is of a uniform transverse cross-sectional configuration throughout the length being machined, the apparatus of the invention will produce an inexpensive and accurate tracer control.

It will be appreciated that if the final contour to be machined includes several cross-sectional configurations throughout its length, yet each configuration, for a specified axial length is consistent in its transverse form, it is possible to use the apparatus of the invention to form such a configuration by substituting different configurations of templates for each axial configuration to be machined. Thus, the apparatus in accord with the invention permits a flexibility permitting it to be used with relatively complex machining operations.

The tracer control system apparatus in accord with the invention may be economically manufactured, and as the apparatus may be used with conventional tracer equipment by the utilization of the stylus restraining apparatus, the apparatus may be utilized with conventional tracer control machine tools without significant modification.

It is to be appreciated that the positioning of the template carriage 60 could be accomplished by means other than the tracer stylus. For instance, a projection may extend from the tracer arm 28 in alignment with the stylus and cutting tool closely received between the carriage positioning surfaces 90, and in this manner the predetermined relationship between the tracer, template and the cutting tool may also be maintained during all phases of cutting. The utilization of the tracer stylus for both sensing the template contour and positioning the template carriage is considered to be of particular advantage in that engagement between the tracer mechanism and template control is at only one location, and the length of the positioner plates is minimized.

It is appreciated that various modifications to the inventive concept may be apparent to those skilled in the art without departing from the spirit and scope of the invention, and it is intended that the invention be defined only by the scope of the following claims.

I claim:

1. A machine tool tracer control system for machining three-dimensional contours having a uniform transverse cross section throughout the length thereof comprising, in combination, a machine tool having cutting tool means and work support means, drive apparatus producing relative movement between said cutting tool means and said work support means in the direction of the length of the contour to be formed and transversely thereto, a servo-motor tracer control fixed with respect to one of said means having a universally movable template engaging stylus connected to and controlling operation of said drive apparatus, a template support fixed with respect to the other of said means, linear elongated guide rods mounted upon said template support disposed parallel to the length of the contour to be formed, a template carriage movably mounted upon said guide rods for movement in the direction of the length thereof, a template mounted upon said carriage having a contour defined thereon corresponding in cross section to the contour to be machined, a pair of parallel planar spaced surfaces defined on said template carriage perpendicular to the length of the contour to be machined and disposed on opposite sides of said template in the direction of the plane of the contour to be formed for positioning said carriage along said guide rods, means engaging said stylus preventing movement of said stylus relative to said tracer control in the direction parallel to the length of the contour to be machined, said stylus engaging said template and closely slidably received between said parallel spaced surfaces whereby said stylus maintains said carriage and template in a predetermined position relative to said tracer during relative movement of said cutting tool means and said work support means in the direction parallel to the length of the contour to be machined, said parallel spaced surfaces and stylus permitting relative movement between said cutting tool means and said work support means in a direction transverse to the length of the contour to be machined.

2. In a machine tool tracer control system as in claim 1, a template holder mounted upon said carriage, and template clamping means defined on said holder releasably clamping said template upon said holder.

3. In a machine tool tracer control system as in claim 2, plates defined on each side of said holder in the direction of the contour to be machined, said spaced surfaces being defined on said plates.

4. In a machine tool tracer control system as in claim 1 wherein said work support means comprises a machine tool table, said tracer control being fixed with respect to said cutting tool means, and said template support being mounted upon said machine tool table.

5. In a machine tool tracer control system as in claim 4 wherein said means engaging said stylus preventing movement of said stylus comprises stylus movement restricting means mounted on said tracer control comprising a pair of spaced linear, parallel surfaces fixed with respect to said tracer control disposed transversely to the direction of the length of the contour to be machined, said stylus being closely received between said surfaces whereby said stylus is restrained from movement in the direction of the length of the contour to be machined.

* * * * *